United States Patent [19]

Taxon

[11] Patent Number: 4,858,956
[45] Date of Patent: Aug. 22, 1989

[54] HIGH PRESSURE, FAST RESPONSE, PRESSURE BALANCED, SOLENOID CONTROL VALVE

[75] Inventor: Morse N. Taxon, Hampton, Va.

[73] Assignee: Siemens-Bendix Automotive Electronics L.P., Troy, Mich.

[21] Appl. No.: 247,999

[22] Filed: Sep. 22, 1988

[51] Int. Cl.$^4$ ............................................. F16K 31/06
[52] U.S. Cl. ......................... 251/129.07; 251/129.16; 251/129.18
[58] Field of Search ...................... 251/129.07, 129.15, 251/129.16, 129.18

[56] References Cited

U.S. PATENT DOCUMENTS

| | | |
|---|---|---|
| 4,002,319 | 1/1977 | Podl et al. |
| 4,235,413 | 11/1980 | Baker |
| 4,256,284 | 3/1981 | Balhouse |
| 4,363,465 | 12/1982 | Morrill |
| 4,471,810 | 9/1984 | Muchow |
| 4,471,841 | 9/1984 | Rector |
| 4,582,294 | 4/1986 | Fargo |
| 4,628,495 | 12/1986 | Peppers et al. |
| 4,641,686 | 2/1987 | Thompson |
| 4,665,939 | 5/1987 | Kreth et al. |
| 4,746,094 | 5/1988 | Cummins |

Primary Examiner—Gerald A. Michalsky
Attorney, Agent, or Firm—Russel C. Wells

[57] ABSTRACT

A high pressure, fast response, pressure balanced reversible flow, solenoid control valve for use in such automotiove applications as electronic valve timing for internal combustion engines and adaptive braking systems. A pressure balanced bearing is connected to a moveable valve member forming a valve cavity therebetween which is at a first pressure. The moveable valve member is also connected to an armature means on the other side of the pressure balanced bearing in an armature cavity. The pressure on the opposite side of the valve member and in the armature cavity is at a second pressure. Thus, the moveable valve member is maintained in a pressure balanced condition and the solenoid then operates against any spring forces, inertia and the viscous effects of the fluid and not the pressure of the fluid. As the solenoid is energized, the armature moves the pressure balance bearing and the valve member to open the valve allowing fluid to flow from a valve inlet to the valve outlet. The control valve may be used in control systems where the fluid flow can be reversible.

8 Claims, 2 Drawing Sheets

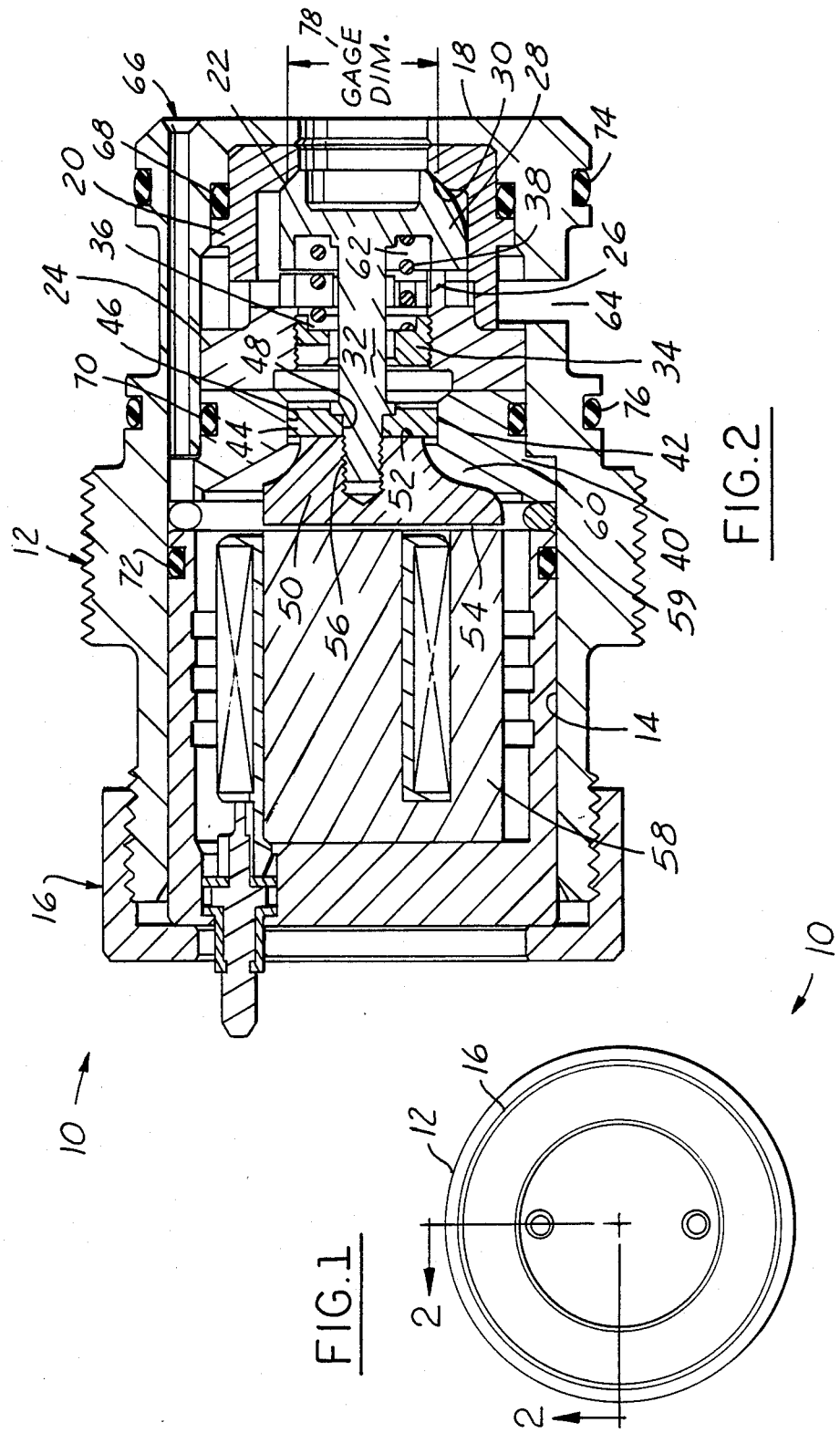

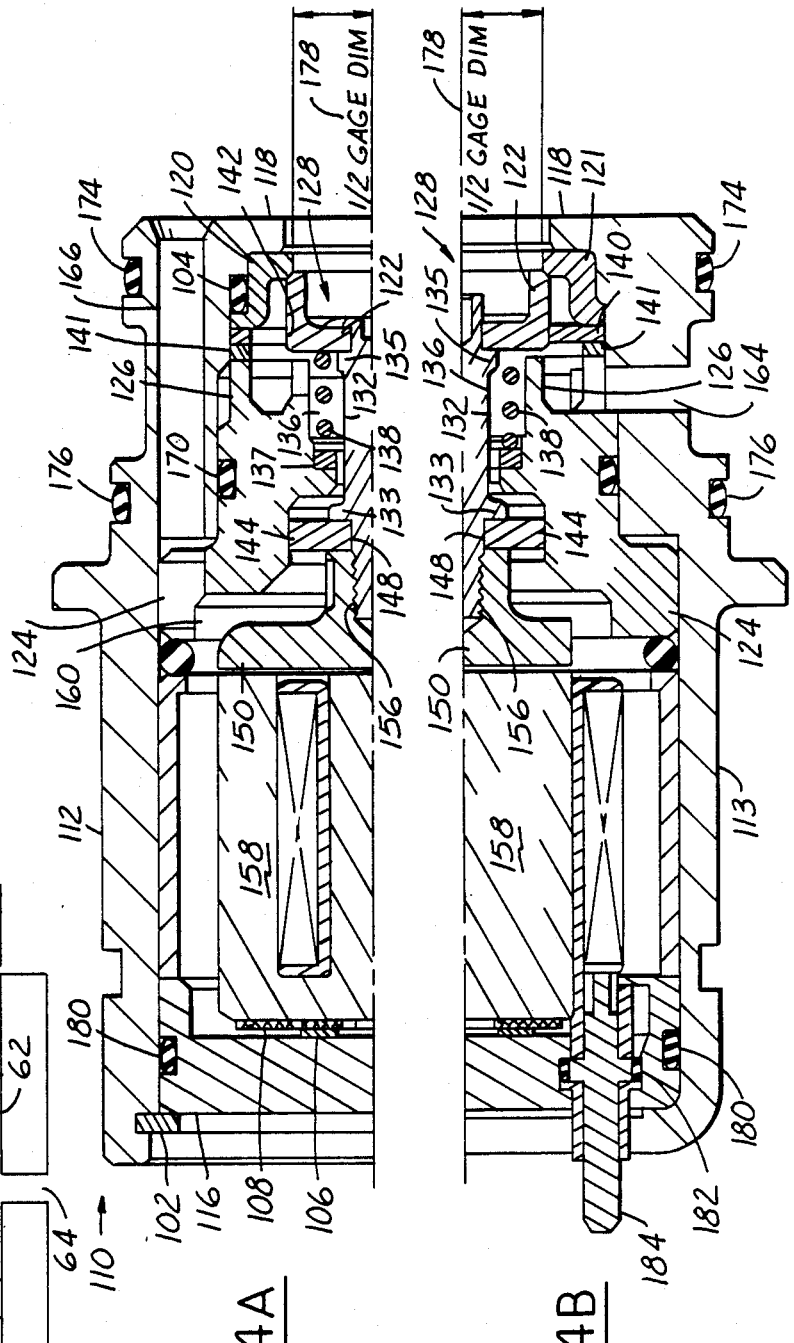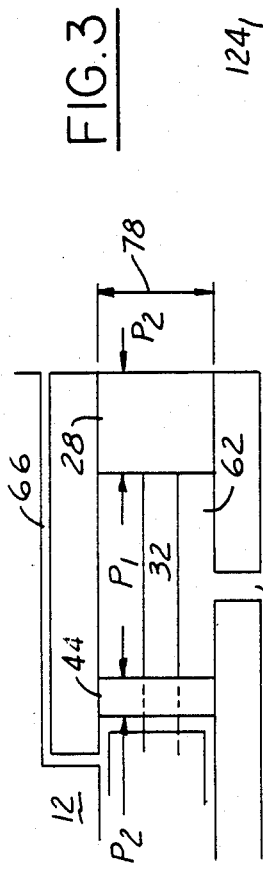

HIGH PRESSURE, FAST RESPONSE, PRESSURE BALANCED, SOLENOID CONTROL VALVE

FIELD OF INVENTION

This invention relates to solenoid control valves in general and in particular to high pressure, fast response, pressure balanced valves.

BACKGROUND OF INVENTION

1. Prior Art

In electrohydraulic systems such as adjustable shock absorbers, active suspension systems, variable power steering systems and other high pressure fluid operating systems, the control valves were large in size. This was necessary in order to package the parts necessary to control the high pressure fluid and to operate within the required operating times. Such valves often required maintenance at frequent intervals to replace seals to stop leakage. In those systems where the pressure fluctuated, the response time of the valve also fluctuated.

Presently, valves capable of operating at fast response times in an environment of a variety of pressures, are very large and require considerable power to operate. This is due in part to the massiveness of the several parts making up the valve. In addition, pressure-unbalanced valves cannot normally develop enough magnetic force to operate at high pressures. In order to provide a pressure balanced valve, a sleeve valve may be used, but this requires very tight manufacturing tolerances and is subject to dirt. In such valves, viscous drag substantially slows down the operation time and valve leakage is inherent. Various other methods of balancing pressure and sealing have been used. Bellows, diaphragms and sliding resilient seals are common. However, these all require extra components. In addition, the durability of these sealing mechanisms limits their use. Also, the presence of these mechanisms adversely affects the dynamic operation of the valves.

2. Summary of the Invention

A high pressure, fast response, pressure balanced solenoid control valve having a housing with an open end and an axially extending tubular passageway terminating in a fluid discharge opening. The housing has an outlet pressure passageway axially extending from a position near the fluid discharge opening to a point intermediate the ends of the housing. A valve seat is located in the passageway adjacent to the opening.

A spherical valve member is axially in line with the valve seat and mates therewith in a conical seat. The spherical valve member has a post extending in an axial direction away from the valve seat. A guide bearing means is positioned in the tubular passageway and axially aligned with the valve seat.

A pressure balancing bearing is located in the guide bearing means for relative axial movement therewith and forms a valve and an armature cavity. The bearing supports the spherical valve member post in a sealed manner.

An armature means is spaced in the armature cavity and aligned with the pressure balancing bearing and is moveable therewith. A spacer means spaces the guide bearing means from a solenoid means. The spacing means is positioned at the interior end of the outlet pressure passageway to provide fluid communication between the armature cavity and the outlet pressure passageway and to provide a gap between a stator means and the armature means when the solenoid means is energized.

A high pressure inlet means is in fluid communication with the valve cavity. High pressure fluid enters into the valve housing through the inlet means and fills up the valve cavity. The pressure of the fluid bears against the pressure balancing bearing and against the inside of the valve element. Since force is a function of pressure and area, the force against the valve cavity sides of both the pressure balancing bearing and the valve element is a function of the cross-sectional area of each of them. In the present invention these cross-sectional areas are equal.

In a similar manner, due to outlet pressure passageway, the pressures in the armature cavity and the pressure downstream of the control valve are equal and since the cross-sectional areas are equal, the fluid pressure does not bias the valve element. A bias spring between a fixed stop in the valve cavity and the valve element holds the valve normally closed.

It is a principal advantage of the present invention to provide a high pressure valve having balanced pressures operating on the valve element and the armature allowing high speed operation.

It is another advantage of the present invention to provide a positive sealing valve with the use of a spherical valve-conical valve seat design.

It is yet another advantage of the present invention to operate the valve in a system independently of the pressures found in the system.

It is yet still another advantage of the present invention to have a solenoid operated control valve operate in a high pressure environment and still be a high speed operation with a fast response time.

Many other objects and purposes of the invention will be clear from the following detailed description of the drawings.

BRIEF DESCRIPTION OF THE DRAWINGS

In the drawings:

FIG. 1 is a view of the top end of the valve;

FIG. 2 is a sectional view taken along line 2—2 of FIG. 1.

FIG. 3 is a schematic view of the pressure balance concept of the present invention.

FIG. 4A is a view similar to FIG. 2 but of an upper half-section of an alternate embodiment; and FIG. 4B is a view similar to FIG. 2 but of a lower half-section of still another embodiment.

DETAILED DESCRIPTION OF A PREFERRED EMBODIMENT

The control valve 10 of the present invention is approximately seventy mm long and thirty-eight mm in diameter. In one particular application of controlling engine intake and exhaust valves, the valve 10 is capable of flowing 200-250 cc/sec of hot engine oil at a differential pressure of 1.4 Mpa. In this application, this control valve 10 operates with a response time between 1.4 ms and 2.25 ms depending on the electronic driver circuit. The closing response time is between 1.6 ms and 2.2 ms depending on the electronic driver circuit. An example of such a system is that described and claimed in a commonly assigned U.S. Pat. No. 4,615,306 issued on Oct. 7, 1986 to Russell J. Wakeman and entitled "Engine Valve Timing Control System" which is incorporated herein by reference.

The control valve 10 comprises a substantially tubular housing 12 having an inner bore 14 of various diameters with an end cap 16 secured at one end opposite a valve opening end 18. Positioned in the inner bore 14 of the tubular housing 12 and adjacent the valve opening end 18 is a valve seat member 20 with a conical valve seat 22. The valve seat member 20 extends axially from the valve opening end 18. Mating with the valve seat member 20 is a valve member 28 having a spherical end 30 and an axially extending post 32. In addition the valve member 28 is so designed to allow fluid to flow pass.

The end of the valve seat member 20 opposite the valve seat 22 locates an armature stop member 24. Together the two members 20, 24 define the "lift" of the valve 10 by means of the spacing between accurately dimensioned tangs 26 on the armature stop member 24 providing one end of the lift of the valve member 28 and the valve seat 22 providing the other end of the lift of the valve member 28. Positioned in an axial bore of the armature stop member 24 is a spring adjust member 34 which is threaded to the armature stop member 24 and together with the valve member 28 forms a spring cavity 36 housing a spring 38.

A guide bearing member 40 is in axial alignment and in contact with the armature stop member 24. The guide bearing member 40 has a closely held axial bore 42 therein. Mounted in the bore 42 is a pressure balancing bearing or pbalbearing 44 which is disk shaped having a spherical edge 46 in the diametrical dimension. The spherical edge 46 slides along the sides of the bore 42 and is sized to provide an effective seal even if the parts are misaligned. The pbalbearing 44 has a central bore 48 which is sized to provide an close fit around the post 32 of the valve member 28. A small amount of sealant, such as a drop between the post 32 and the pbalbearing 44, is used to effect a seal. The pbalbearing 44 is moved by the movement of the valve member 28. Positioned in contact with the pbalbearing 44 on the side opposite the armature stop member 24, is an armature 50. The armature 50 has a pair 52, 54 of spaced parallel broadsides normal to the axis of the housing 12. Into one broadside 52, is a central closed-end threaded hole 56 into which the end of the post 32 of the valve member 28 is threaded and secured.

The other broadside 54 of the armature 50 is a large flat surface which is substantially rectangular-shaped with one of the pair of opposite sides of the rectangular-shaped being radial and the other pair of opposite sides being parallel to each other. This design allows fluid to flow pass the armature 50. The other or large flat broadside 54 surface of the armature 50 is magnetically coupled to a stator assembly 58. Positioned between the stator assembly 58 and the guide bearing member 40 and along the inner bore 14 is a split-ring spacer 59 which provides an armature cavity 60 extending from the face of the stator assembly 58 adjacent to the armature 50 to the pbalbearing 44. The split ring spacer 59 also provides a gap between the face of the stator assembly and armature in the energized position. This gap facilitates a fast release when the solenoid is deenergized.

A second cavity or valve member cavity 62 ends from the valve seat member 20 to the pbalbearing 44. The input to the valve member cavity 62 is by means of high pressure inlet port 64 extending through the side wall of the housing 12. Fluid enters through the inlet port 64 and by means of several passages in the armature stop member 24, spring adjust member 34 and valve seat member 20, the high pressure fluid bears against the pbalbearing 44 and the valve member 28.

From the valve opening end 18 of the housing 12, an internal passageway 66 extends to the armature cavity 60 and allows fluid to flow between the armature cavity 60 and the outlet of the valve 10. Several seals 68, 70, 72 are Provide to prevent the unwanted flow of fluid and pressure between the cavities and the end of the control valve 10 opposite the valve opening end 18. One seal 68 is between the valve seat member 20 and the interior wall of the housing 12, a second seal 70 is between the guide bearing member 40 and the inner bore 14 of the housing 12 and a third seal 72 is between the stator assembly 58 and the inner bore 14 of the housing 12. With these seals 68, 70, 72, leakage fluid in the armature cavity 60 can not flow out of the end of the housing 12 or into the valve member cavity 62. Likewise fluid in the valve member cavity 62 which is typically at a higher pressure than the fluid in the armature cavity 60 can not flow or leak into the armature cavity 60 or around the valve seat member 20 and out of the control valve 10.

In operation, the pressure balanced solenoid control valve 10 of the present invention, being a bottom feed valve, is positioned to receive high pressure fluid. Such may be a fluid line for conducting the high pressure fluid to the solenoid control valve 10 or it may be a storage cavity in which the solenoid control valve 10 is positioned. A pair of seals 74, 76 are positioned on the outer surface of the housing 12 and on either side of the inlet port 64 to prevent the flow of fluid out of the storage cavity in any direction but through the inlet port 64 of the solenoid control valve 10. The valve opening end 18 of the housing 12 is immersed into a valve output cavity which may contain the same fluid as in the external cavity but at a substantially different pressure such as in a closed oil system as shown in U.S. Pat. No. 4,615,306.

As previously indicated, the pressure in the valve output cavity is in communication with the armature cavity 60 by means of the internal passageway 66. In this setup, the moving members of the control valve 10 such as the valve member 28 are in pressure balance. The area of the pbalbearing 44 and the area of the valve seat 22 at the gage dimension 78, where the valve element and the valve seat contact each other, being equal, the force exerted by the high pressure against the pbalbearing 44 and the valve member 28 are equal and in the opposite directions. Likewise the force exerted by the output pressure against the opposite side of pbalbearing 44 and the valve seat 22 are equal and opposite. The force exerted by the bias spring 38 in the spring adjust member 34 against the valve member 28 operates to keep the valve 10 closed.

When the stator assembly 58 is energized, the magnetic lines of force operate to pull the armature 50 toward the stator assembly 58 and since the armature 50 is secured to the valve member 28 forming a unitary member, the spherical end 30 of the valve member 28 leaves the valve seat 22 as the bias spring 38 is compressed. In such an operation the magnetic force must overcome only the spring force, inertia, and the viscous effects of the fluid in order to open the valve 10. The magnitude of the input and the output pressures do not affect the operation of the valve member 28.

The armature stop member 24 is positioned to stop the movement of the valve member 28 before the broadside 54 surface of the armature 50 seats against the face of the stator assembly 58. This is further ensured by the size of the spacer 59. The fluid between the broadside 54 surface of the armature 50 and the face of the stator assembly 58 is squeezed out and flows through the internal passageway 66 to the output of the valve 10. To facilitate this squeeze, the encapsulation of the stator assembly 58 is recessed relative to the ends of the E-core. Since this fluid has already been outside of the valve output cavity, it is not a quantity of fluid that needs to be accounted for during the operation of the solenoid control valve 10.

When the power is removed from the stator assembly 58, the force exerted by the bias spring 38 returns the valve member 28 to the valve seat 22 closing the valve 10. During the operation of the valve 10 the pbalbearing 44 slides in the bore 42 in the guide bearing member 40. As previously stated the dimensional tolerance between the diameter of the bore 42 and the outside diameter of the pbalbearing 44 is held very tight on the order of 0.003 mm diametrical and the contact diameter between the spherical end 30 and the conical valve seat 22 is set as the gage dimension 78.

The ferrous part of the stator assembly 58 can be an E-core configuration of either laminated sections or a single powdered-metal construction, or in the alternative it can be a cylindrical solenoid design. In a similar manner the armature 50 can be either the broadside surface design as illustrated or rectangular or cylindrical plunger which would fit into a bobbin. In the preferred embodiment, the stator assembly 58 is filled with an epoxy or an injection molded plastic.

As this is a solenoid control valve 10, the adjustments for lift, spring preload and air gap are provided. Lift is determined by the dimension from the gage dimension 78 at the conical valve seat 22 to the arresting surface of the tangs 26 on the armature stop member 24. The spring 38 preload is set to a predetermined value by means of the threaded spring adjust member 34 which once set is welded or secured by some means into place in the armature stop member 24. Alternatively, the spring preload can be adjusted by using shims to change the working length of the spring in its normal position. The air gap is set by measuring the total stack-up of the several parts and the desired "lift" and a suitable shim is used to space the armature 50 from the stator assembly 58 by an amount which is equal to the lift plus the desired air gap.

There has thus been shown and described a pressure balanced solenoid control valve 10 which does not use either bellows or diaphragms. FIG. 3 is a schematic of the pressure balancing concept of the control valve of FIG. 2. In the valve cavity 62, the inlet pressure $P_1$ is applied against the valve member 28 and the pbalbearing 44. Balancing the pressure is accomplished by matching the pbalbearing 44 diameter to the conical valve seat diameter at the gage dimension of the valve seat interface and then referencing the pressure $P_2$ in the armature cavity 60 against the pbalbearing 44 to the pressure outside of the valve seat by means of the fluid flow through passageway 66. It is to be understood, that since this is a pressure balanced, solenoid control valve 10, flow can be in either direction by reversing the pressures and having the high pressure on the output side of the valve member 28.

Referring to FIGS. 4A and 4B, which are alternate embodiments of the solenoid control valve of FIG. 1. In FIGS. 4A and 4B, the elements of FIG. 2 which are functionally similar are referenced by adding one hundred to the reference numerals shown in FIG. 2. The first construction of FIG. 4A is the top half of the FIGURE from the centerline and includes a snap ring 102 secured by the housing 112 against the end cap 116. The second construction of FIG. 4B is the bottom half of the FIGURE and shows the housing 113 rolled over and the snap ring 102 not present.

Another difference in the two constructions is the omission of an o-ring 104 around the valve seat member 120. In FIG. 4A, the o-ring 104 is shown while in FIG. 4B the housing 113 and the valve seat member 121 are in an interference fit relationship and the o-ring seal is not required.

Still another difference, with the snap ring 102, a belleville washer or conical spring 106 and flat plate 108 are used between the end cap 116 and the stator assembly 158 and in the rolled over housing 113 of the bottom half, the washer and plate are not needed.

The housing 112 is tubular with a valve opening end 118 having an output port and the open end of the internal passageway 166 at this end. Positioned adjacent to the output port and within each housing 112,113 is a conical valve seat member 120 and 121 having a conical seat forming a gage dimension 178, one half of the gage dimension being illustrated. A valve member assembly 128, having a post 132 and a valve member 122, mates with the valve seat member 120,121.

The valve assembly 128 is connected to an armature means comprising a pbalbearing 144 and an armature 150. The post 132 has a stop means 133 intermediate its ends which bears against the pbalbearing 144. The end of the post 132 extends through the pbalbearing central bore 148 and is secured into the hole 156 in the armature 150. This is similar to the embodiment of FIG. 2 with the exception that the pbalbearing 144 does not have a counterbore into which the stop means 133 is positioned. In FIGS. 4 and 4B, the post, pbalbearing and the armature are assembled together and any sealing means, if necessary is positioned around the bore 148 and the hole 156 to prevent any flow of fluid therein.

Attached to the other end of the post 132 is the valve member 122 which bears against a second stop means 135 on the post. Once the valve member 122 is tight against the second stop means 135, a drop of sealant is applied and then the end of the post is rolled over to contain the valve member 122 as shown in FIG. 4A. One means of rolling over the end is by orbitally riveting. The sealant is to prevent any flow of fluid between the post 132 and the valve member 122.

A guide bearing member 140 is positioned adjacent the valve seat member 120,121 to guide the valve member 122. In the preferred embodiment, the guide bearing member 140 is welded to the valve member 122. The guiding surface is the guide bearing bore 142. Between the guide bearing member 140 and the stop bearing tangs 126 is a shim member 141 which provides the predetermined lift of the valve. Lift is defined as the axial distance between the tangs 126 and the adjacent face of the valve member 122.

The armature stop member 124 is a powdered metal part combining the armature stop member 24, the guide bearing member 40, the guide bearing bore 42 and the spring adjust member 34 of the valve 10 of FIG. 2. After hardening, the two ends of the armature stop member are ground parallel and the pbalbearing bore is ground to the gage dimension 178.

The armature stop member 124 has a spring cavity 136 into which is positioned a spring shim 137 to provide a predetermined preload on the spring 138.

As with the valve 10 in FIG. 2, the valve 110 is a high pressure, fast response, pressure balanced solenoid valve. High pressure enters into the valve through the inlet port 164 and flows in the spring cavity 136 bearing against the pbalbearing 144 and the valve member 122. Low or outlet pressure bears against the opposite side of the valve member 122 and pbalbearing 144. Thus there is a balance of forces and the armature means is moved under the attracting of stator assembly 158.

Several seals are positioned throughout the valve 110 to ensure that pressure and fluid does not flow between certain cavities and out of the valve. The seal 170 on the outer surface of the armature stop member 124 prevents high pressure to flow from the spring cavity 136 to the armature cavity 160. A pair of seals 174 and 176 are positioned to seal the valve 110 into a mounting cavity. The end cap 116 has a seal 180 in its outer surface to prevent the flow of fluid out of the end of the valve. A small seal 182 is positioned in a cavity formed by the stator assembly 158 and the end cap 116 to seal the terminals 184 to the solenoid coil.

An alternative to the pbalbearing is a spring-loaded PTFE sliding seal. The advantages of this seal is that there would be no leakage between the seal and the bore in the armature stop member 124.

Many changes and modifications in the above described embodiment of the invention can, of course, be carried out without departing from the scope thereof. Accordingly, that scope is intended to be limited only by the scope of the appended claims.

I claim:

1. A high pressure, fast response, pressure balanced, solenoid control valve comprising:
   a housing with an open end and an axially extending tubular passageway from said open end and terminating in an outlet at the other end;
   a solenoid means located in said housing;
   a valve seat member having a conical valve seat located in the passageway adjacent to said outlet;
   a spherical valve member axially in line with said valve seat member, said valve member seats along a contact line in said valve seat;
   said spherical valve member having an axially extending post axially extending in a direction away from said conical valve seat;
   a guide bearing means positioned in said tubular passageway and axially aligned with said valve seat;
   a pressure balancing bearing mounted around said post and located in said guide bearing means, the diameter of said contact line and the diameter of said bearing being equal;
   a valve cavity extending between said bearing and said conical valve seat;
   an armature cavity extending between said solenoid means and said bearing;
   armature means spaced in said armature cavity and mounted to the end of said post, said armature means magnetically coupled to said solenoid means, said armature means and said valve member forming an unitary member having reciprocal movement and with said valve cavity therebetween;
   inlet means in fluid communication with said valve cavity for receiving fluid at a first pressure; and
   an outlet pressure passageway axially extending from a position near said outlet to said armature cavity for transmitting fluid at a second pressure, said unitary member being in pressure balance with said second pressure on each end and said first pressure in said valve cavity.

2. A high pressure, fast response, pressure balanced, solenoid control valve according to claim 1 additionally including spacer means spacing said guide bearing means from said solenoid means for providing an air gap between said solenoid means and said armature means.

3. A high pressure, fast response, pressure balanced, solenoid control valve according to claim 1 additionally including an armature stop member in said valve cavity between said guide bearing means and said valve member forming a limit to the axial travel of said unitary member in a direction away from said conical valve seat under control of said solenoid means.

4. A high pressure, fast response, pressure balanced, solenoid control valve according to claim 3 wherein said guide bearing member and said armature stop member include a spring adjust member and form an integral structure fabricated from powdered metal.

5. A high pressure, fast response, pressure balanced, solenoid control valve according to claim 1 additionally including a bias spring in the valve cavity for biasing said valve member against said conical valve seat, whereby the solenoid control valve is normally closed.

6. A high pressure, fast response, pressure balanced, solenoid control valve according to claim 5 additionally including a spring adjust member for said bias spring, said spring adjust member being adjustable for setting the spring preload.

7. A high pressure, fast response, pressure balanced, solenoid control valve according to claim 1 additionally including sealing means at each end of said valve cavity.

8. A high pressure, fast response, pressure balanced, reversible flow, solenoid control valve comprising:
   a housing having a fluid discharge end and an open end;
   an end cap mounted in said open end;
   solenoid means mounted axially in said housing and adjacent said end cap;
   a valve seat member mounted adjacent to said fluid discharge end, said valve seat member having a conical valve seat;
   armature means axially aligned with said valve seat member, said armature means having,
      a valve member having a spherical valve for mating with said conical valve seat,
      a post member axially extending from said valve member, said post member sealing connected to said valve member,
      bearing means axially sealing connected to said post member and axially spaced from said valve member,
      an armature secured to said post and sealing fastened to said bearing means;
   armature stop means having an axially extending aperture for slidingly receiving said bearing means, said armature stop means having tangs adjacent to said valve member for limiting the travel of said armature means;
   guide bearing means for guiding said valve member;
   bias spring means located in said armature stop means for biasing said valve member into engagement with said conical valve seat;

a valve cavity extending from said bearing means to said conical valve seat;

first passage means for communicating fluid to said valve cavity at a first pressure;

an armature cavity between said bearing and said solenoid means;

second passage means for communicating fluid to said armature cavity at a second pressure whereby said armature means is pressure balance with said first pressure in said valve cavity and said second pressure pushing against the axial ends of said armature means.

* * * * *